COLORED LIGHT SYSTEM

Original Filed June 1, 1954 2 Sheets-Sheet 1

Inventor:
William E. Glenn,
by Paul A. Frank
His Attorney.

COLORED LIGHT SYSTEM

Original Filed June 1, 1954 2 Sheets-Sheet 2

Inventor:
William E. Glenn,
by Paul A. Frank
His Attorney.

United States Patent Office

Re. 25,169
Reissued May 15, 1962

25,169

COLORED LIGHT SYSTEM

William E. Glenn, Scotia, N.Y., assignor to General Electric Company, a corporation of New York Original No. 2,813,146, dated Nov. 12, 1957, Ser. No. 433,448, June 1, 1954. Application for reissue Oct. 28, 1959, Ser. No. 849,422
20 Claims. (Cl. 178—5.4)

Matter enclosed in heavy brackets [ ] appears in the original patent but forms no part of this reissue specification; matter printed in italics indicates the additions made by reissue.

This invention relates to an apparatus and method for producing and projecting colored light images in accordance with a color intelligence signal.

While this invention is subject to a wide range of applications, it is especially suited for use in a color television system and is particularly described in that connection.

Apparatus and methods are known for projecting black and while light images on a screen and for projecting television images on a screen. A form of television projection system may consist of a light modulating medium which is used as a light valve. A system of bars defining a system of slits is placed between a source of light and the medium. A second system of bars and slits is placed between the medium and a projection screen. When no signal is applied to the medium the light passing through the first system of slits falls directly on the bars of the second system of bars and slits and when the medium is modulated by an electron stream the light is deflected sufficiently to pass through the slits. The amount of light passed is determined by the amount the medium is modulated by the video signal. In this manner, an enlarged television image may be produced on a screen. The width of the slits is great enough so that all color components that are diffracted by the medium are passed, thereby resulting in a black and white image.

This system has the advantage of permitting the use of an intense source of light such as an arc lamp, and controlling the intensity of light projected on a screen by a video signal. It is noted that the modulating medium may be applied to the face of a mirror to control the direction of reflected light. Previously known systems, of the general type described, have been used to project sequential color information but have not been capable of projecting simultaneous color information on a screen by the use of a single light modulating medium.

It is an object of this invention to provide a method and apparatus for projecting a colored light image.

Another object of this invention is to provide an apparatus and method for controlling the relative intensities of the color components from a source of white light.

A further object of this invention is to provide an apparatus and method for reproducing simultaneous color television pictures.

This invention provides an apparatus and method for controlling the intensity and color of light projected by a light projection system. This apparatus, in a preferred embodiment, comprises a light modulating medium, the light modulating characteristics of which are controlled in accordance with color intelligence signals by applying the signal to the medium.

Figure 1:
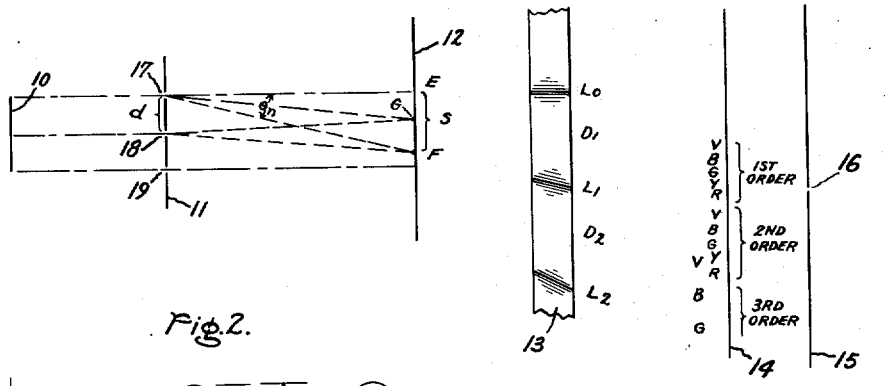
Figure 2:
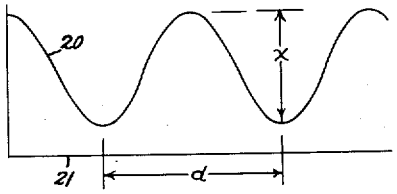
Figure 3:
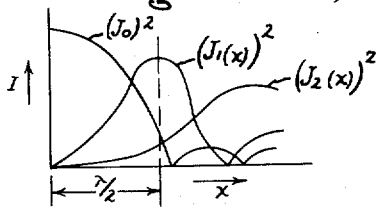
Figure 5:
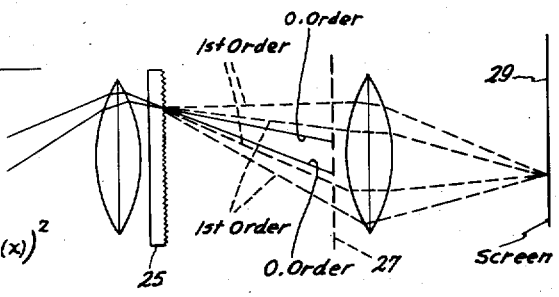
Figure 4:
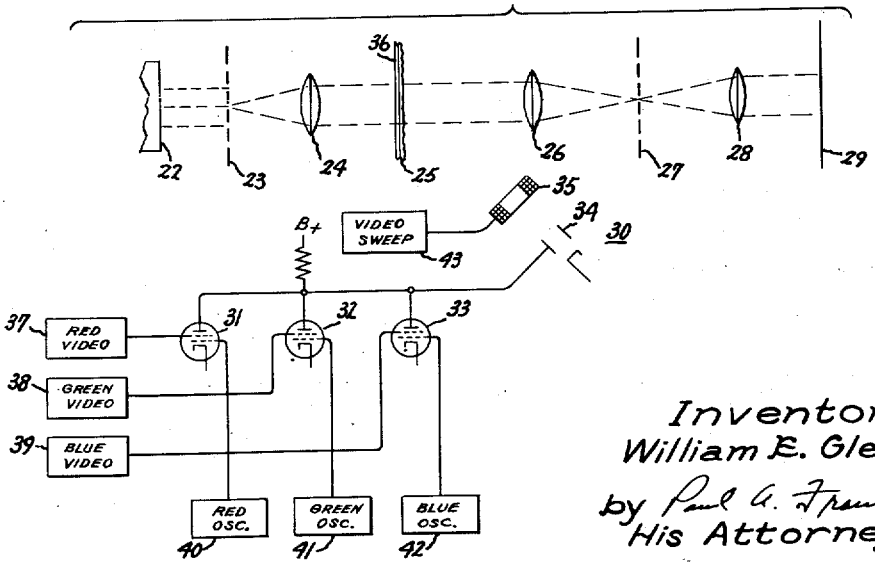
Figure 6:
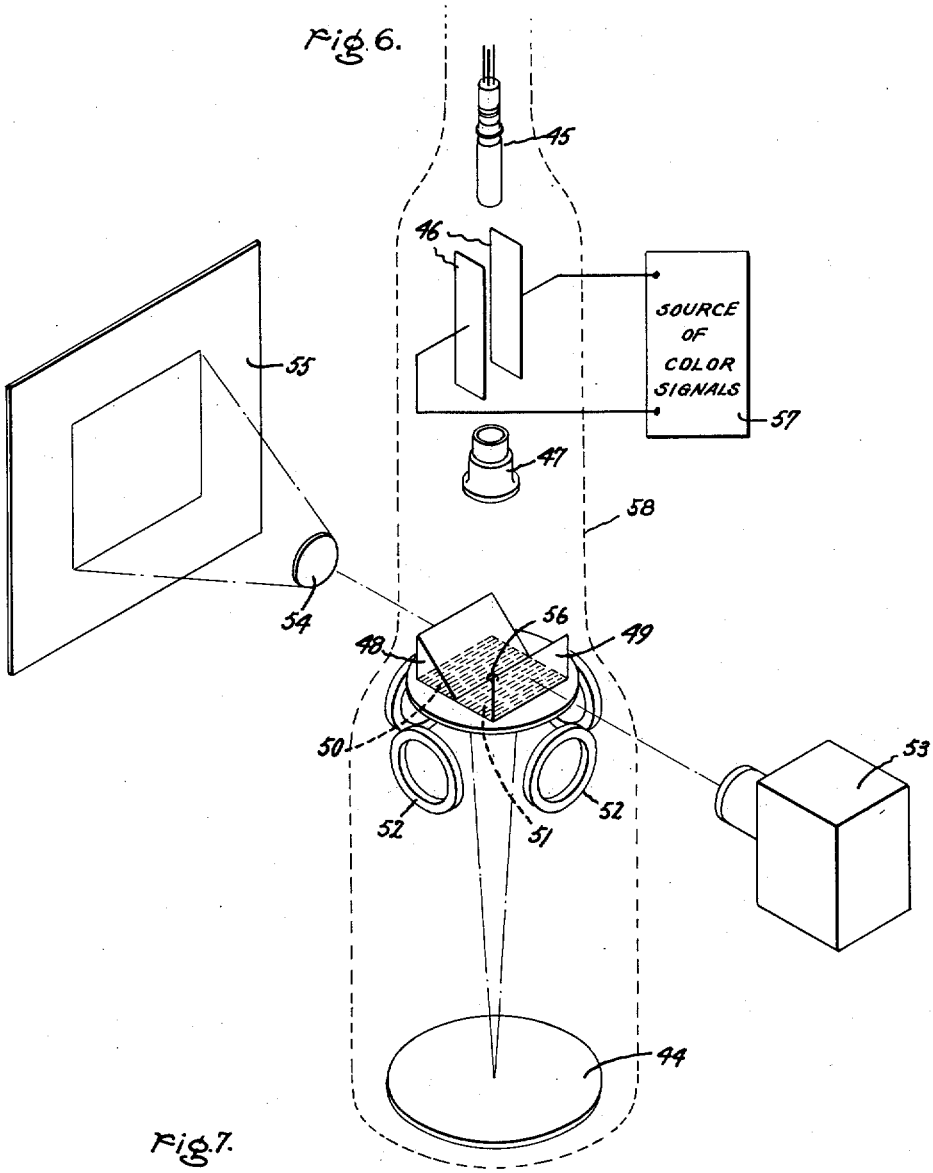
Figure 7:
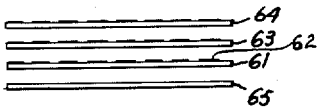

A better understanding of this invention may be had by referring to the figures of the drawing in which Figures 1 through 3 are illustrative of well known optical principles; Figure 4 is a semi-schematic diagram of a system in accordance with this invention; Figure 5 illustrates a feature of the system illustrated in Figure 4, Figure 6 is an illustration of a specific embodiment of this invention, and Figure 7 illustrates a second embodiment of this invention.

A diffraction grating is a light transmitting or reflecting medium which breaks up a ray of impinging monochromatic light into a series of light and dark banks or white light into colored bands of the spectrum of light present in the ray. White light is generally considered to be but is not necessarily limited to light made up of all color components in the visible spectrum which may be considered to be light with wavelengths ranging from approximately 4000 to 8000 angstrom units. Light of a single component color having a single wavelength only, is generally defined as monochromatic light.

A diffraction grating may be formed by distorting the surface of a medium so that light projected through or reflected from this medium is diffracted into its component colors. The respective color components follow paths which deviate from a line normal to the effective plane of the medium by an amount which is a function of the wavelength of the particular color component. This invention, according to a preferred embodiment, utilizes a system of bars and slits which are so oriented with respect to the medium that the wavelength of the light that is passed by the slit system is controlled by the modulating medium. Three diffraction gratings are effectively superimposed on the modulating medium to form a single composite grating so that a color image is passed by the system of slits which corresponds to the color intelligence applied to distort the modulating medium.

Figure 1 illustrates basic optical principles reviewed herein as an aid to understanding of a specific embodiment of this invention. Figure 1 shows a light source 10, an elementary diffraction grating 11, a plane 12, a representation of the distribution of monochromatic light 13, a representation of the distribution of color components of diffracted white light 14 and a slit system 15. The slits illustrated in grating 11 are separated by a distance d, of the order of a wavelength of light, and may be considered to form a small part only of a grating.

For the purposes of this discussion it is assumed that the light from source 10 comes from a sufficient distance so that a plane wave falls on grating 11. The light arrives at the left hand surface of diffraction grating 11 in the same phase at all points on the surface. It is well known that light may be considered to be formed of a series of rays which travel outwardly from any given point. Therefore, all light passing through the slits in grating 11 does not travel in the same direction. Portions of this light are separated or diffracted as illustrated by the lines extending from the slits in grating 11 to the screen 12. A portion of the light passing through the slit 17 strikes region E on screen 12 and a portion of this light strikes region F. Light from slit 18 in diffraction grating 11 in part strikes region G and other portions strike F in phase with the light from slit 17 so that light is observed at region F. The light arriving at G from slit 17 is out of phase with light from slit 18 so that no light is observed at region G. The light does not form areas of absolute dark and light but forms regions varying in light intensity from absolute black to light.

It is noted that the preceding discussion in regard to Figure 1 has been limited to that case where the light source 10 consists of monochromatic light. It is apparent from the distribution of light illustrated in region 13 that there are successive regions of light and dark. These light regions are designated by $L_0$, $L_1$ and $L_2$ and the dark regions by $D_1$ and $D_2$. That region in which the light is not diffracted as designated by the reference $L_0$ and is called the zero order diffraction pattern. This zero order diffraction pattern has a finite width as illustrated by the shaded area. The next area designated by $D_1$—$L_1$ is generally defined as the first order diffraction pattern. The light from slit 17 falling in this region. which is centered about the point F on screen 12, has been delayed one wavelength with respect to the light from slit 18. In a like manner, $D_2$ and $L_2$ designate the dark and light regions of the second order diffraction pattern in which light from slit 17 is delayed two wavelengths before reaching the screen 12, light from slit 18 is delayed one wavelength, both with respect to a third slit designated as 19.

The relationship between the slit distance d in the diffraction grating 11 and the distance between the zero and first order diffraction patterns yields a well known equation. This equation is written $$\frac{n\lambda}{d}=\sin\theta_n \qquad (1)$$

where $\lambda$ is the wavelength of the light under consideration, d is the grating spacing and $\theta_n$ is the angle formed between a line from the $n^{th}$ order diffraction pattern to the grating with respect to a line from the zero order defraction pattern to the grating.

It is apparent from Equation 1 that the definition of the light and dark areas, which may be termed the resolution of grating 11, is increased as the spacing between the slits or grating is decreased thereby resulting in an increased number of slits per unit area.

It is also apparent from Equation 1 that, for a given grating spacing, the angle $\theta_n$ will vary with the wavelength of the light applied to the diffraction grating. If the monochromatic light source 10 is replaced by a source of white light a spectral array of colors results. The shorter wavelengths are diffracted least from the zero order direction and the longer wavelengths such as the red colors are diffracted the greatest amount. The first, second and third order color distribution is represented on plane 14. It will be noted that there is an overlapping of the second and third order diffraction patterns. Therefore, with the illustrated diffraction grating a complete spectrum of pure spectral colors is obtained in the first order diffraction pattern only.

Screen 15 may be considered to be provided with a slit 16 which is of sufficient width and is properly oriented to pass only a selected color from the first order diffraction pattern. Therefore, only those color components from source 10 which are in register with the slit 16 in screen 15 are passed by the screen. The remainder of the light impinges on the optically opaque portion of screen 15. If the distance d between the grating lines is changed, a different color is passed by screen 15. Therefore, the color of the light passed by the screen 15 may be controlled by varying the grating spacing.

The system of the present invention uses in place of the fixed parameter or static diffraction grating 11 of Fig. 1 a superimposed or composite grating of the phase grating type with each component of the grating corresponding to a component color. Color intelligence signals are used to control the intensity of the light passed by each of the three gratings in accordance with three spectral color components which may be combined to produce any color light or white light. For example, the intensity of light passed by one of the gratings is controlled by a signal representative of blue light, the intensity of light passed by a second grating by a signal representative of green light, and the intensity of light passed by a third grating by a signal representative of red light. The slit 16 in screen 15 is oriented to pass blue, green and red light in the first order diffraction pattern from the three gratings respectively.

The diffraction grating that has been discussed in relation to Figure 1 may consist of a piece of glass or photographic film defining alternate optically opaque and optically transparent areas. The light passes directly through this glass or film or the glass or film may be provided with a silvered reflecting surface on the back thereof so that light passes through the diffraction grating in two directions. The ability of this type of grating to control the intensity of light passing through the grating is limited as is the ability to control the light intensity of the colors in any one order diffraction pattern. Therefore, it is necessary to resort to a type of diffraction grating which may be used to control the intensity of light. By way of example, a preferred embodiment of this invention uses a grating generally referred to as a phase grating which controls the color distribution and intensity in the diffraction pattern.

A portion of a phase grating is illustrated in Figure 2 of the drawing. Light may be passed through this grating or a light reflecting layer may be applied to the front surface 20 or back surface 21 of the grating so that light may be reflected from surface 20 or surface 21. The surface 20 forms a sine wave distortion on the medium forming the grating so that light applied to the grating is shifted in phase in accordance with a sine function of the distance d along the grating; therefore, the grating of Figure 2 is generally defined a sine function phase grating. It is noted that diffraction and intensity control effects can be obtained with other grating configurations. The essential feature is that there be provided a light modulating medium the light modulating effects of which can be controlled by an external signal source. The specific embodiment of this invention which is described, utilizes a sine function phase grating; however, this invention may be carried out by utilizing diffraction gratings having other configurations.

Figure 3 illustrates a plot of the Bessel function squared of light intensity as a function of the grating amplitude x in a sine function phase grating for the zero order diffraction pattern at $(J_0)^2$, the first order diffraction pattern at $(J_1)^2$, and the second order diffraction pattern at $(J_2)^2$. It may be shown that the light intensity of monochromatic light varies as the square of the Bessel function of the grating amplitude x. Figure 2 shows the wavelength of the sine function phase grating as the dimension d which is the substantial equivalent of the dimension d in Figure 1. Equation 1 also expresses the relation between dimension d, the light wavelength and the angle subtended by the first order diffraction pattern of the sine function phase grating illustrated in Figure 2.

The maximum intensity of monochromatic light in the first order diffraction pattern occurs when the distance x from peak to trough of the sine function grating is such that a phase difference of one-half wavelength exists between light emanating from a trough and from a peak of the phase grating. This invention utilizes light in the first order diffraction pattern only. The slits in a screen, such as slit 16 in screen 15 of Figure 1, are of such width as to pass the first order diffraction pattern and some second order diffraction pattern from adjacent slits in grating 11. The second order diffraction intensity is low enough relative to the first order diffraction intensity so that the eye detects colors from the first order diffraction pattern only; therefore, a preferred embodiment of this invention is said to utilize the first order diffraction pattern colors.

In view of the foregoing, it is apparent that the intensity and color of light passed may be controlled by a phase grating and slit system. A given component of a color picture may be considered to be made up of a mixture of colored light. These light colors may be selected in any convenient fashion. For the purpose of the explanation in this specification one particular color grouping is selected although it will be clearly understood by those skilled in the art that any system of color coordinates may be selected to operate in the apparatus of this invention.

It is considered that any given color may be composed of a mixture of a pure blue light, a pure green light and a pure red light. Screen 15 is provided with a plurality of slits of such width and spacing relative to the modulating medium that only first order diffraction components are passed, whereby a color picture may be obtained from a white light source.

According to an embodiment of this invention a given color is projected by passing white light through a phase grating with wavelength $d_1$ selected to pass red light, a second phase grating with a wavelength $d_2$ to pass green light and a third phase grating with a wavelength $d_3$ to pass red light. The respective amplitudes of the red, green and blue components are controlled by varying the amplitude of the peak to the trough distance x of the respective phase gratings. The light passed by each of these gratings is passed through a slit and bar system such as screen 15 to obtain the given colored light.

In a preferred embodiment the sine function components representative of the wavelengths and intensities of the three color components are instantaneously combined to obtain a composite phase grating wave form which results in the desired color being passed by the output bar and slit system which corresponds to the screen 15 of Fig. 1. The sum of three television color signals are combined to simultaneously modulate the scanning velocity of an electron stream which is applied to the modulatnig medium and results in a composite diffraction phase grating equivalent to three superimposed phase gratings so that the desired color is transmitted through the output bar and slit system.

An approximate equation may be written for the intensity of the first order color signal, for example, a red signal in a composite phase grating, and appears as Equation 2.

$$I_{R1}=[J_{1(R)}\cdot J_{0(B)}\cdot J_{0(G)}]^2 \qquad (2)$$

This relation indicates that the intensity of the red signal is approximately equal to the square of the first order Bessel function of the red signal times a factor consisting of the product of the zero order Bessel function of the blue signal and the zero order Bessel function of the green signal. This equation relates the effective cross-modulation of the colors. It may be shown that for low phase grating amplitudes, the zero order Bessel function product is substantially unity so that the squared first order Bessel function for the red component is a reasonably good representation of the intensity of the transmitted red signal.

Figure 4 illustrates an example of an application of this invention to a light transmission system for projecting a color television image on a screen. There is shown a source of light 22, a first bar system 23, a lens system 24, a light modulating medium 25, a lens system 26, a bar system 27, a projection lens system 28 and a screen 29. A portion of a video system 30 provides an electron stream for deforming modulating medium 25.

The modulating medium 25 is deformed by the electron stream from the video system 30. Light from source 22 is projected on bar system 23 which consists of a system of bars separated by slits. When the modulating medium 25 is not deformed by the electron stream, the lens system 24 and 26 project the image of the slits in bar system 23 onto the bars of the bar system 27 so that no light from source 22 passes through lens system 28 to the projection screen 29. When the modulating medium 25 is distorted by the electron stream in accordance with color video signals, the light from source 22 passes through the slits of bar system 23 and is diffracted so that it passes through the slits in system 27 and is projected on the screen 29.

The light modulating medium distorting system comprises mixer tubes 31, 32 and 33 into which are fed the outputs of a source of red video signals 37, a source of green video signals 38 and a source of blue video signals 39. These three signal sources provide the amplitude signal for the light modulating coating 25 on plate 36.

The system utilizes three oscillators 40, 41 and 42 which provide separate fixed frequency signals for each of the respective colors. For example, the red oscillator provides a 14 megacycle signal, the green oscillator provides a 17 megacycle signal and the blue oscillator provides a 20 megacycle signal.

The respective red video signal and red oscillator signal are mixed in converter 31. The green and blue video signals are mixed with the respective color controlling oscillator signals in converters 32 and 33 respectively. The resulting output of the converters 31, 32 and 33 is a 14 megacycle, 17 megacycle and 20 megacycle signal respectively the amplitudes of which are controlled by the video signal input for the respective colors. The combined output of tubes 31, 32 and 33 is applied to the electrostatic deflection plates 34 of the illustrated electron gun. The output of the electron gun is swept across the modulating coating in a conventional manner by magnetic deflection coils 35 which are fed by video sweep source 43 to form an interlace sweep trace. It is noted, that as an alternative, a signal mixing system may be used in which each of tubes 31, 32 and 33 serves as an oscillator and as a mixer.

The resulting signals which are applied to electrostatic deflection plates 34 cause a variation in the sweep rate at the frequency of oscillation for the given color. The amplitudes of the color video signals determine the peak to trough distance in the resulting phase grating and thereby the relative intensities of the colors projected for each picture element, *and the luminance of the picture.* The three colors are combined as illustrated so that an element-by-element simultaneous color picture is obtained. *That is, the resulting phase grating produces upon the slit system 27 an interference spectra such that only light of predetermined dominant wave lengths is passed, these wave lengths being related to the colors of which the voltage waves from sources 40, 41, and 42 are representative.* It is noted that a complete color television receiving system is not shown since this invention may be adapted to a variety of conventional color television systems. In order to obtain satisfactory color and picture resolution, a particular embodiment of my invention utilizes approximately 10 grating lines per picture element.

Any satisfactory source of light may be used, for example, the source of light 22 may consist of an arc lamp or a conventional projection lamp which is fed through a lens condensing system so that an image of the filament or of the arc is projected on the slits of bar system 23. The bar system 23 may consist of a transparent material such as glass with optically opaque bars painted thereon or as an alternative a sheet of non-magnetic material with milled slits may be used. The center-to-center spacing between the slits in the bar system 23 is 50 mils and the width of the slits is 10 mils. The spacing of the bars and slits in the bar system 23, as well as the spacing of the bar system in the over-all optical system, is determined by application of well known optical relations.

Bar system 27 consists of 18 mil slits with a 50 mil center-to-center spacing. It may be shown that the intensity of light on the screen is approximately proportional to the product of the width of the slits in bar system 23 times the width of the slits in bar system 27 so that the intensity is a maximum, for a given color resolution or band of colors passed, when the width of the slits in bar system 23 and 27 are equal. With the lens system utilized, better picture element resolution is realized, without appreciably reducing the efficiency, by making the slits in the second bar system wider than the slits in the first bar system to counteract the diffracting effects of the second bar and slit system 27.

Figure 5 illustrates schematically the bar and slit system utilized in a preferred embodiment of this invention. The slits are spaced in accordance with well known optical principles to provide for overlapping diffraction patterns. It is assumed, for purposes of this discussion, that the modulating medium 25 is distorted so that green light only will be passed by the bar system 27. The solid lines represent the paths followed by light in the zero order diffraction pattern and the dashed lines represent the green light in the first order diffraction pattern. The zero order and first order diffraction pattern green light is labeled for the light coming from a pair of slits in a bar system, such as 23 in Figure 4, which is diffracted by a single point of modulating medium 25. An additional slit is provided on each side of the zero order pattern and between the zero order and first order patterns. These slits pass first order light form adjacent slits. By utilizing a bar system with overlapping diffraction patterns as shown in Figure 5 a gain in light output by a factor of three is obtained over bar systems which do not utilize bar systems with overlapping diffraction patterns.

The light modulating medium 25 illustrated in Figure 4 may be made of any material, the light phase shifting characteristics of which may be altered by an external stimulus to which color intelligence may be added. The external stimulus may take the form of an electron beam, heat, sound, or any other form of energy which varies the phase shifting characteristics of the modulating medium. As an example of one type of modulating medium, there is illustrated in Figure 4 a transparent member 36 and a gelatinous layer which is the modulating medium 25. To form this modulating medium a conductive gelatinous coating, approximately 3 mils thick, is placed on the surface of the transparent member 36.

In this embodiment the layer used as a modulating medium is distorted by being struck with electrons which build up temporary charges on one surface of the layer. The charged portions of the surface are attracted to the opposing surface thereby forming valleys or dips in the gelatinous layer.

In the system illustrated in Figure 4, gelatinous layer 25 on transparent plate 36 must be easily distorted. If the layer is too thick the distance between the charge placed by the electron stream on the surface of gelatinous layer 25 and the surface of 36 will be too great and the medium will not be easily deformed. If the layer is too thin, there will be too little material to be squeezed out between the top surface of the layer and the surface of 36 so that it will be difficult to obtain sufficient grating amplitude on the layer.

It is also necessary that the modulating medium withstand bombardment by an electron stream without the properties thereof changing. The time constant at which charges leak off must be such that the gelatinous material resumes its original shape before the next color intelligence signal is projected on to a given area of the modulating medium; however, as a matter of practical design it is sometimes necessary to effect a compromise between persistence and light intensity thereby resulting in a one or two frame holdover of deformation for high intensity picture elements.

It is noted that the source of electrons which modulate the diffraction coating may take any number of forms and that the illustrated circuits is given merely by way of example and is not intended to be limiting. Other methods may be devised for applying the color intelligence to a modulating coating so as to vary the light modulating characteristics thereof and result in a color image. For example, this invention may be easily adapted for use with conventional single side band systems in which color intelligence in a form other than signals representative of pure spectral colors is carried on separate side bands along with the black and white video signal.

This system can also be utilized to project a black and white picture. For example, this may be accomplished by feeding a fixed signal from the red, green and blue video sources onto the plates so as to obtain a black and white signal. The relative strengths of the red, green and blue video sources remain constant, however, the total amplitude output varies in accordance with the intensity of the picture elements of the black and white signal. This invention can be adapted for use with field sequential color system by sequentially distorting the medium 25 with a modulating signal representative of each of the component colors.

It will be readily appreciated that the systems of Figure 4 may be readily adapted to a reflecting system such as that illustrated in Figure 6 which shows another embodiment of this invention utilizing a reflecting wave system which is essentially the same as the system of Figure 4 except that the modulating coating has been placed on a spherical mirror 44. The system consists of an electron gun 45, electrostatic color signal deflecting plates 46, focusing anode 47, prisms 48 and 49, bar and slit systems 50 and 51, magnetic scanning coils 52, coated spherical mirror 44, light source 53, projection lens 54 and viewing screen 55. A source of color signals 57 is coupled to deflecting plates 46. A portion of the system may be enclosed in an evacuated envelope having a configuration such as that illustrated by the dashed outline 58.

Light from source 53 is projected on prism 49 and is reflected downward through bar system 51 to the surface of gel coated spherical mirror 44. If no signal is applied to the gel coated mirror the light reflected by the mirror strikes the opaque bars in the bar system 50 which is placed on the bottom of prism 48. When a properly modulated electron stream is projected along the axis of mirror 44 through the hole 56, between the prisms 48 and 49, and on to the gel coated spherical mirror 44, the light from source 53 is diffracted so as to pass through the slits in bar system 50 and be reflected by prism 48 so as to pass through projection lens 54 on to screen 55 thereby resulting in a color image. The scanning coils 52 cause the electron stream to sweep mirror 44 and are placed below prisms 48 and 49 so that the electron gun may be oriented on the mirror axis.

It is noted that reference numerals 50 and 51, used to designate the bar system in Figure 6, are considered to be the equivalent of the bar systems 23 and 27 illustrated in Figure 4 of the drawing. The mirror may be coated with any satisfactory modulating medium such as a silicone oil or a gelatinous form of silicone oil. It is noted that the signal applied to plates 46 by source 57 may consist of a signal such as that produced by the system 30 which is schematically illustrated in Figure 4.

Figure 7 illustrates an embodiment of this invention which consists in the utilization of black and white photographic film to produce a colored light or picture image. This is accomplished by preparing three bar and slit systems 61, 63 and 64. Bar system 61 is formed by placing strips of red light absorbent material 62 on a sheet of clear film. The strips of red light absorbent material having a center to center spacing equal to the width of the slits in an equivalent diffraction grating that would pass red light only when placed in the position of light modulating medium 25 in the system illustrated in Figure 4. Bar system 63 and 64, with strips of green and blue absorptive material respectively, are prepared in a similar manner have the same spacing relative to the red strips as the green and blue wave lengths have respectively relative to the red wave length.

The three systems 61, 63 and 64 are superimposed on a sensitized black and white photographic plate or film 65 and a picture of a colored object is photographed, the colored light acting as the color intelligence signal. The photographic plate is developed and substituted for modulating medium 25 in a system such as that illustrated in Figure 4. When light from source [41] *22* is projected through the system including the exposed photographic plate a colored light image of the photographic object results.

This will be more apparent when the effect of bar system 61 on the photographic film is considered alone. If it is assumed that red light only is projected on the photographic plate or film, it is then apparent that the areas between strips [42] *62* will be exposed and optically opaque when the film is developed. The film which was under the strips transmits light, and the plate or film acts as an intensity diffraction grating of such spacing that red light only is projected on screen 29 when the film is substituted for modulating medium 25.

It will be apparent to those skilled in the art that this invention provides a method and apparatus for producing color images in accordance with an applied color intelligence signal. The embodiments specifically described and illustrated herein are given merely by way of example and are not to be considered limiting since this invention may take a wide variety of forms.

What I claim as new and desire to secure by Letters Patent of the United States is:

1. A system for presenting color information on a light modulating medium corresponding to a display comprising a unitary light modulating medium, and means simultaneously subjecting said light modulating medium to color intelligence signals having different values of one parameter corresponding to different color components in the display and a second parameter varying in accordance with the intensity of each of said different color components, *said means including electrical means for providing an arrangement of electrical charge on a surface of said light modulating medium under the control of said color intelligence signals* to establish simultaneously diffraction patterns on said medium with each pattern having a parameter corresponding to a different one of said components and a second parameter varying point-by-point with the intensity of said one of said components.

2. A system for presenting color information on a light modulation medium corresponding to a display comprising a unitary light modulating medium, and means simultaneously subjecting said light modulating medium to color intelligence signals having different values of one parameter corresponding to different color components in the display and a second parameter varying in accordance with the intensity of each of said different color components, *said means including electrical means for providing an arrangement of electrical charge on a surface of said light modulating medium under the control of said color intelligence signals* to deform said medium and establish simultaneously phase diffraction patterns on said medium with each of said patterns having a wave length corresponding to a different one of said color components and an amplitude varying point-by-point with the intensity of said one of said components.

3. A system for producing a color image corresponding to a display comprising a unitary light modulating medium, means simultaneously subjecting said light modulating medium to color intelligence signals having different values of one parameter corresponding to different color components in the display and a second parameter varying in accordance with the intensity of each of said different color components, *said means including electrical means for providing an arrangement of electrical charge on a surface of said light modulating medium under the control of said color intelligence signals* to establish simultaneously diffraction patterns on said medium with each pattern having a parameter corresponding to a different one of said components and a second parameter varying point-by-point with the intensity of said one of said components, and a source of light for illuminating said medium with substantially parallel light rays and means including a light mask for blocking zero order light diffraction patterns emanating from said medium and passing first order light diffraction patterns emanating from said medium to produce an image having point-by-point color and intensity correspondence with the display.

4. A system for producing a color image corresponding to a display comprising a unitary light modulating medium, means simultaneously subjecting said light modulating medium to color intelligence signals having different values of one parameter corresponding to different color components in the display and a second parameter varying in accordance with the intensity of each of said different color components, *said means including electrical means for providing an arrangement of electrical charge on a surface of said light modulating medium under the control of said color intelligence signals* to deform said medium and establish simultaneously phase diffraction patterns on said medium with each of said patterns having a wave length corresponding to a different one of said color components and an amplitude varying point-by-point with the intensity of said one of said components, and a source of light for illuminating said medium with substantially parallel light rays and means including a light mask for blocking zero order light diffraction patterns emanating from said medium and passing first order light diffraction patterns emanating from said medium to produce an image having point-by-point color and intensity correspondence with the display.

5. A system for producing a color image corresponding to a display comprising a unitary light modulating medium, means providing electrical color intelligence signals having different values of one parameter in accord with color components of said display and a second parameter varying in accordance with the intensities of said components, means producing an electron beam and scanning it over a surface of said light modulating medium, means controlling said beam by said electrical color intelligence signals to establish superimposed diffraction patterns on said medium with each pattern having a parameter corresponding to one of said color components and a second parameter varying point-by-point with the intensity of said one of said components, a source of light for illuminating said medium with substantially parallel light rays and means including a light mask for blocking zero order light diffraction patterns emanating from said medium and passing first order light diffraction patterns emanating from said medium to produce an image having point-by-point color and intensity correspondence with the display.

6. A system for producing a color image corresponding to a display comprising a unitary light modulating medium, means providing electrical color intelligence signals having different values of one parameter in accord with color components of said display and a second parameter varying in accordance with the intensities of said components, means producing an electron beam and scanning it over a surface of said light modulating medium, means controlling said beam by said electrical color intelligence signals to deform said medium and establish superimposed phase diffraction patterns on said medium with each of said patterns having a wave length corresponding to a different one of said color components and an amplitude varying point-by-point with the intensity of said one of said components, a source of light for illuminating said medium with substantially parallel light rays and means including a light mask for blocking zero order light diffraction patterns emanating from said medium and passing first order light diffraction patterns emanating from said medium to produce an image having point-by-point color and intensity correspondence with the display.

7. The method of producing color images corresponding to a display which comprises establishing on a light modulating medium elemental area diffraction gratings each having a first grating parameter providing an angle of light diffraction corresponding to the color of the display in the corresponding elemental image area and having a second grating parameter varying with the intensity of the light in the corresponding elemental area of the display by transmitting to *a surface of* said modulating medium *an arrangement of electrical charge under the control of* color intelligence signals having one parameter corresponding point-by-point with the color of the display and a second parameter varying point-by-point over the area of the display in accordance with the intensities of the component colors, transmitting to said medium essentially parallel rays of white light and masking zero order light diffraction patterns emanating from the medium and passing first order light diffraction patterns emanating from said medium to produce an image having point-by-point color correspondence with said display.

8. In combination, a unitary light modulating medium, *means for applying an arrangement of electrical charge to a surface of said medium,* a source of superimposed color intelligence signals *for modulating said arrangement of electrical charge,* a source of light, a first member defining a plurality of optically transparent areas separated by optically opaque areas, said member being oriented between said source of light and said medium, a second member defining a plurality of optically transparent areas separated by optically opaque areas and oriented so that light from said source can pass through said second member when said signals are simultaneously applied to said modulating medium.

9. In combination, a unitary light modulating medium, *means for applying an arrangement of electrical charge to a surface of said medium,* a source of superimposed color intelligence signals *for modulating said arrangement of electrical charge,* a source of light, a first member defining a plurality of optically transparent areas separated by optically opaque areas and oriented between said source of light and said medium, a second member defining a plurality of optically transparent areas separated by optically opaque areas and oriented so that color components of light from said source can pass through said second member only when said signals are applied to said modulating medium and means for simultaneously applying said signals to said medium.

10. In a colored light projecting system a unitary light modulating medium *means for applying an arrangement of electrical charge to a surface of said medium,* a source of superimposed color intelligence signals *for modulating said arrangement of electrical charge,* a source of light, a first member defining a plurality of optically transparent areas separated by optically opaque areas, said first member being located between said source of light and said medium, a second member defining a plurality of optically transparent areas separated by optically opaque areas and oriented so that the color components of light from said source which pass through said second member are controlled by said signals applied to the modulating medium, and means for simultaneously applying said signals to said medium.

11. In a color television system including an electron gun for producing a stream of electrons, a unitary visible light modulating medium, means for causing said electron stream to strike said medium, a source of superimposed color intelligence signals, a source of white light, a first member defining a plurality of optically transparent areas separated by optically opaque areas oriented between said source of light and said medium, a second member defining a plurality of optically transparent areas separated by optically opaque areas and oriented so that the color components of light from said source that pass through said second member is controlled by the color intelligence signals, and means for applying the color intelligence signals to modulate said electron stream to control the color and intensity of the light passing through said second member.

12. In a color television system, a unitary visible light modulating medium, an electron gun producing a stream of electrons substantially perpendicular to a surface of said medium, a source of superimposed color intelligence signals, a source of white light, a first member defining a plurality of optically transparent areas separated by optically opaque areas oriented between said source of light and said medium, a second member defining a plurality of optically transparent areas separated by optically opaque areas and oriented so that the color components of light from said source that pass through said second member are controlled by the color intelligence signals, and means for applying the color intelligence signals to modulate said electron stream to control the color and intensity of the light passing through said second member.

13. A system for the display of colored light information in response to superimposed color intelligence signals, which system comprises a source of light, a unitary light modulating medium receiving light from said source, *means for applying an arrangement of electrical charge to a surface of said medium, said arrangement of electrical charge being modulated by said color intelligence signals,* a first member defining a plurality of optically transparent areas separated by optically opaque areas and oriented between said source and said medium, display means for colored light information, a second member defining a plurality of optically transparent areas separated by optically opaque areas and oriented between said medium and said display means, said first and second members cooperating to block the passage of light from said source to said display means in the absence of said signals, and means for simultaneously imposing diffraction grating patterns upon said medium in response to said signals to display said colored light information.

14. A system for the display of colored light information in response to superimposed color intelligence signals, which system comprises a source of light, a unitary light modulating medium receiving light from said source, a first member defining a plurality of optically transparent areas separated by optically opaque areas and oriented between said source and said medium, display means for colored light information, a second member defining a plurality of optically transparent areas separated by optically opaque areas and oriented between said medium and said display means, said first and second members cooperating to block the passage of light from said source to said display means in the absence of said signals, and deformation means *for applying an arrangement of electrical charge to a surface of said light modulating medium under the control of said color intelligence signals* for simultaneously imposing phase grating diffraction patterns upon said medium in response to said signals to cause components of light from said source to be displayed as said colored light information, said deformation means including means to vary the amplitude of said patterns to control light intensity in said display, and means establishing wave length of said patterns to control the color components in said display.

15. A system for presenting color information on a light modulating medium corresponding to a display comprising a unitary light modulating medium, means providing electrical color intelligence signals each having different values of one parameter in accordance with different color components of said display and a second parameter varying in accordance with the intensity of each of said different components, means producing an electron beam and scanning it over a surface of said light modulating medium, means simultaneously controlling said beam by said electrical color intelligence signals to establish superimposed diffraction patterns on said medium with each pattern having a parameter corresponding to a different one of said color components and a second parameter varying point-by-point with the intensity of said one of said components.

*16. Apparatus for producing color television images by means of a source of a plurality of wavelengths of light, an image-bearing medium, means for deforming the surface of said medium, first and second slit systems, said medium being located between said first and second slit systems, said source being adapted to cause said light of said plurality of wavelengths to pass through said*

*first slit system and through said image-bearing medium, means for applying signals representative of the color components of said televised objects to said means for deforming said medium, said deforming means thereupon being adapted to cause frequency and amplitude modulated deformations in said medium, the frequencies of said modulated deformations being such as to permit only certain of said plurality of wavelengths of light to pass through said second slit system onto said viewing surface, the amplitude of said modulated deformations being such as to control the amounts of said certain wavelengths which pass through said second slit system, said light passing second slit system in response to said amplitude and frequency modulated deformations being adapted to produce color television images on a viewing surface.*

*17. Apparatus for producing color television images, comprising first and second slit systems, an image-bearing medium located between said slit systems, means for transmitting light of a plurality of wavelengths through said first slit system and through said medium, means for deforming the surface of said medium, means for applying signals representative of selected color components of televised objects to said deforming means, said deforming means thereupon causing deformations in said medium whose frequency is related to the hue of said color components, said deforming means being further adapted to modulate said deformations in amplitude, the amplitude of said modulations being related to the intensity of said color components, said frequency of said deformations causing said medium to form interference spectra on said second slit system so that said second slit system passes substantially only light predetermined dominant wavelengths, said amplitude modulations causing proportionate amounts of light of said predetermined dominant wavelengths to pass through said second slit system.*

*18. Color television projection apparatus, comprising first and second slit systems, an image-bearing medium located between said slit systems, means for transmitting light of a plurality of wavelengths through said first slit system and through said medium, means including deflecting means for deforming the surface of said medium, a plurality of means for producing oscillatory waves having respectively different frequencies, a plurality of modulating means each coupled to a corresponding one of said means for producing said oscillatory waves, means for applying each of a plurality of voltage waves representative of selected color components of televised objects to a corresponding one of said modulating means, said modulating means thereupon being adapted to produce output waves of a given frequency which are modulated in amplitude in response to one of said color representative voltage waves, means for combining said output waves, means for applying said combined output waves to said means for deforming said medium, said medium thereupon producing interference spectra, said interference spectra falling upon said second slit system such that substantially only light of predetermined dominant wavelengths passes through said second slit system, said dominant wavelengths being related to the colors of which said voltage waves are representative, the amount of light of said predetermined dominant wavelengths passing through said second slit system being related to the intensity of said color representative voltage waves.*

*19. A system for projecting color television images in response to signals containing a plurality of voltage waves representative of selected color components and representative of the luminance components of a televised object, comprising in combination first and second slit systems, an essentially transparent conductive liquid positioned intermediate said first and second slit systems, means for modulating said liquid in response to said luminance components whereby surface deformations of said liquid having amplitude variations corresponding thereto are produced, means for modulating said liquid whereby surface deformations having frequency and amplitude variations corresponding to said color components are produced, and means for passing light having a plurality of wavelengths through said first slit system and said liquid, said liquid thereupon being adapted to cause varying amounts of said light to pass through said second slit system as a function of the amplitude of the deformations in its surface corresponding to said luminance components, said liquid being further adapted to cause light of a restricted number of said plurality of wavelengths to pass said second slit system as a function of the frequency of the deformations in its surface corresponding to said color components, said light passing said second slit system thereby producing a color television image on a viewing surface.*

*20. Color television projection apparatus comprising first and second slit systems, an image bearing medium located between said first and second slit systems, means for transmitting light of a plurality of wave lengths through said first slit system and through said medium, means for deforming the surface of said medium, means for producing oscillatory waves having a plurality of different frequencies corresponding to respective colors, means to modulate waves of each of said frequencies, and to apply the modulated wave to said deforming means, a source of a plurality of voltage waves representative of selected color components of televised objects, and means to apply each of said voltage waves to said modulating means to modulate an oscillatory wave of frequency corresponding to the respective color component, said deforming means thereby causing deformations in said medium the frequencies of which correspond respectively to each of the frequencies of said oscillatory waves, and the amplitude of which are related to each of said color representative voltage waves, said medium thereupon causing different interference spectra to fall upon said second slit system in response to light transmitted by said medium, said spectra falling on said second slit system in such fashion that substantially only light of different predetermined dominant wave lengths pass therethrough to form a color image of said televised objects.*

References Cited in the file of this patent or the original patent

UNITED STATES PATENTS

| | | |
|---|---|---|
| 2,330,172 | Rosenthal | Sept. 21, 1943 |
| 2,391,451 | Fischer | Dec. 25, 1945 |
| 2,513,520 | Rosenthal | July 4, 1950 |
| 2,600,397 | Fischer | June 17, 1952 |
| 2,605,352 | Fischer | July 29, 1952 |
| 2,623,942 | Schlesinger | Dec. 30, 1952 |
| 2,646,462 | Sziklai | July 21, 1953 |
| 2,681,380 | Orthuber | June 18, 1954 |
| 2,723,305 | Raibourn | Nov. 8, 1955 |
| 2,740,829 | Gretener | Apr. 3, 1956 |
| 2,740,830 | Gretener | Apr. 3, 1956 |
| 2,740,833 | Gretener | Apr. 3, 1956 |

OTHER REFERENCES

Wood: "An Application of the Diffraction-Grating to Colour-Photograph," London, Edinburgh, and Dublin Philosophical Magazine and Journal of Science, Fifth Series, vol. 47, Jan.-June 1899, pages 368 to 372. (Q1 P5 in Scientific Library—Patent Office.)